United States Patent [19]

Rauen

[11] 4,157,221

[45] Jun. 5, 1979

[54] STRIP PRINTER ADJUSTABLE MASK AND MARKER

[75] Inventor: Raymond J. Rauen, Detroit, Mich.

[73] Assignee: Guardian Industries Corporation, Northville, Mich.

[21] Appl. No.: 884,516

[22] Filed: Mar. 8, 1978

[51] Int. Cl.² ............... G03B 29/00; G03B 27/52; G03B 27/58; B26D 5/08

[52] U.S. Cl. .................................. 355/29; 83/577; 355/40; 355/74

[58] Field of Search ............... 355/29, 18, 21, 27, 355/28, 40, 125, 126, 72, 74; 83/575–577, 635, 588, 698; 24/263 A

[56] References Cited

U.S. PATENT DOCUMENTS

| | | | |
|---|---|---|---|
| 1,061,727 | 5/1913 | Carkhuff | 355/125 |
| 3,006,052 | 10/1961 | Stickney et al. | 24/263 A |
| 3,089,384 | 5/1963 | Baasner | 355/74 |
| 3,369,449 | 2/1968 | Klauss et al. | 355/18 |
| 3,563,560 | 2/1971 | Johnson | 83/698 X |
| 3,674,365 | 7/1972 | Köhler et al. | 355/40 |
| 3,677,638 | 7/1972 | Daugherty | 355/125 X |
| 3,772,954 | 11/1973 | De Ruwe et al. | 83/588 X |
| 3,807,855 | 4/1974 | Zajac | 355/29 |
| 3,841,185 | 10/1974 | Baran | 83/577 X |

*Primary Examiner*—Donald A. Griffin
*Attorney, Agent, or Firm*—Cullen, Sloman, Cantor, Grauer, Scott & Rutherford

[57] ABSTRACT

In an apparatus for exposing a strip of photographic positive paper to light shining through a strip of photographic negatives for producing latent photographic images, an adjustable length mask for defining the outline of each photographic image print on the positive paper strip. The mask, which overlies the positive paper strip, includes manually movable plates for adjusting the length of the mask opening. An automatically operated marker punch is mounted upon the mask, offset from the lighted print area, and includes a replaceable thin punch blade positioned to form a narrow slot in the paper at the lead edge of each separate print, which slot is later used to actuate a cutter mechanism for cutting apart the developed prints from the positive paper strip.

9 Claims, 9 Drawing Figures

STRIP PRINTER ADJUSTABLE MASK AND MARKER

BACKGROUND OF INVENTION

The adjustable mask and marker of this application is formed for use within an automatic photographic strip printer. By way of background, strip printers are devices used by commercial film processors to expose a photographic negative image upon sensitized positive paper to form the latent photographic image upon the positive paper. Development of the positive paper then produces the finished photograph or "print".

A typical strip printer receives a roll of developed negatives and advances the negative images, one by one past a light source and lens system for projecting the image. A roll of sensitized positive paper feeds the positive paper strip through the area of projection from the negative, from which area the exposed, latent image containing paper is rewound upon a second roll which is then taken from the strip printer and processed with developing types of chemicals to produce the finished photographs. After the photographs are developed upon the strip of positive paper, they are cut apart to form single prints.

In such type printers which are automatically operated and which handle long rolls of negatives and correspondingly long rolls of positives, various types of masks are used to delineate the single picture area upon the positive during the time that the image is projected thereon from the negative. In commercial production of photographs, the producer typically assembles together a large number of negative strips from a large number of customers so that the negative roll might be in the order of hundreds of feet in length, but all including photographs of the same size. Since various cameras produce photographs of different sizes, and since there are several different standard sizes, it is possible to schedule the printer to handle a roll of first one size negatives and then another, and accommodating the different sized photographs by using different size masks, i.e., with different size mask openings, to produce the exact size required on the positive. The mask opening becomes very important, particularly where the so called borderless prints are produced, that is prints which have no white border surrounding the picture area.

In addition, it is necessary to provide a mark upon each print and also upon the end of each order, i.e., a single customer's order of a number of prints, so that the cutter mechanism used to separate the developed prints can be appropriately signalled for cutting in the correct locations. Such marks must be located in an area which not interfere with the appearance of the finished print and preferably in an area which will be trimmed away by the cutter.

An example of the apparatus described above is illustrated in U.S. Pat. No. 3,807,855 issued Apr. 30, 1974 to Zajac. In such patent, a strip printer is illustrated schematically and a masking and marking system is disclosed.

The use of the marker as a means of signalling a cutter is disclosed in U.S. Pat. No. 3,813,976 to Greer issued June 4, 1974. Here, the punch slot or mark made on the strip of positive paper during the exposure from the negative, is used to signal a cutter which cuts apart the prints, including trimming away the slot mark.

The invention herein relates to a frame which can be adjusted into required length size, manually, merely by pushing the parts momentarily without the need for replacement of frame parts or the use of tools or time consuming shut downs for adjusting frames. The punch used in conjunction with this adjustable mask is a very simplified, relatively fool-proof construction for automatic operation.

SUMMARY OF INVENTION

The invention herein contemplates the provision of an adjustable mask to be located on the wall which divides the photographic negative strip from the photographic positive paper strip so that the mask delineates the border or edges of the latent image print projected upon the positive. The mask is formed of a U-shaped unit to provide a base and two sides, with the fourth side of the mask being in the form of a movable strip which is slidably interconnected to the side parts of the mask and which is mechanically interconnected thereto by gearing so that mechanical movement of either the U-shaped unit or the movable strip results in both moving relative to each other to thereby lengthen or shorten the framed area.

Mounted upon the mask, remote from the inner edges which define the opening, is a punch mechanism which is operated by an electrical solenoid so that it may be actuated simultaneously to the image exposure or light shining step. The punch mechanism includes a punch blade which is held, at a distance from the mechanism, closely adjacent to the lead edge of the latent picture and which upon actuation, forms a very thin or narrow slot which provides a mark for later use in actuating the cutter. Actually, a pair of these punch mechanisms are provided so that one provides the slot for each picture and the other provides a slot for each order or series of pictures to signal a completion of an order.

It is contemplated to form the punch mechanism with a simple, inexpensive blade that can be easily replaced when worn, with a minimum of time and labor required.

As an overall objective, the invention herein contemplates the formation of a mask which is adjustable in length. The adjustment of width is not necessary in a typical commercial printing operation. The mask includes the punch mechanism mounted in such a manner as to be properly located each time the mask is adjusted. Thus, the construction makes it possible to adjust the length of the image print and the location of the punch with only a momentary stoppage of the operation of the printer. The operator can merely open a door at the paper holding compartment, reach into the equipment and simply by tripping a locator and pushing or sliding the mask for a moment, have it automatically positioned for the appropriate size print and with the marker device appropriately located for that adjusted size print.

Another object of this invention is to provide the adjustable frame and the marker secured upon and movable therewith, of a simple construction with few moving parts so as to require minimal service and to permit rapid replacement of the punch blade, which is the only element that normally wears relatively rapidly.

These and other objects and advantages of this invention will become apparent upon reading the following description, of which the attached drawings form a part.

DETAILED DESCRIPTION

Figure 1:
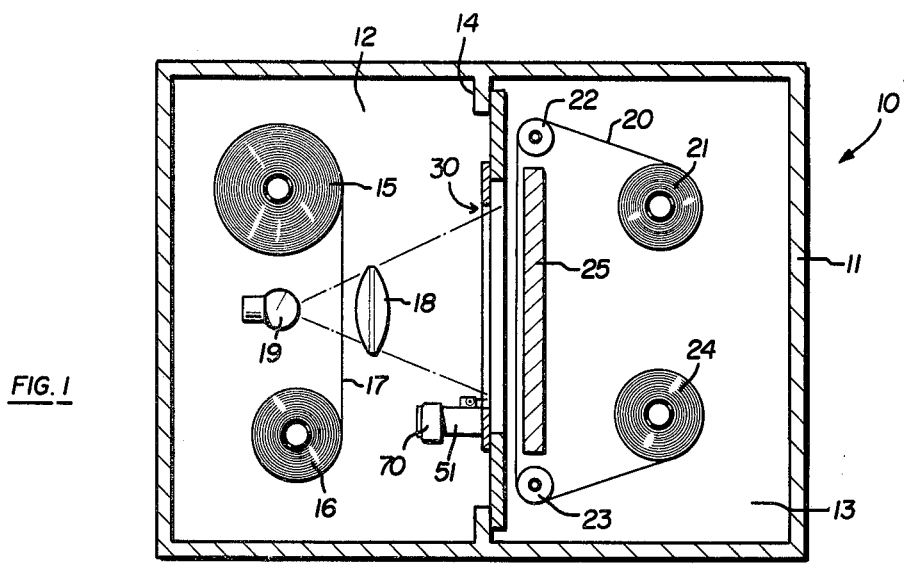
FIG. 1 is a schematic, cross-sectional view of an automatic strip printer with the adjustable mask and marker schematically illustrated in position.
Figure 2:
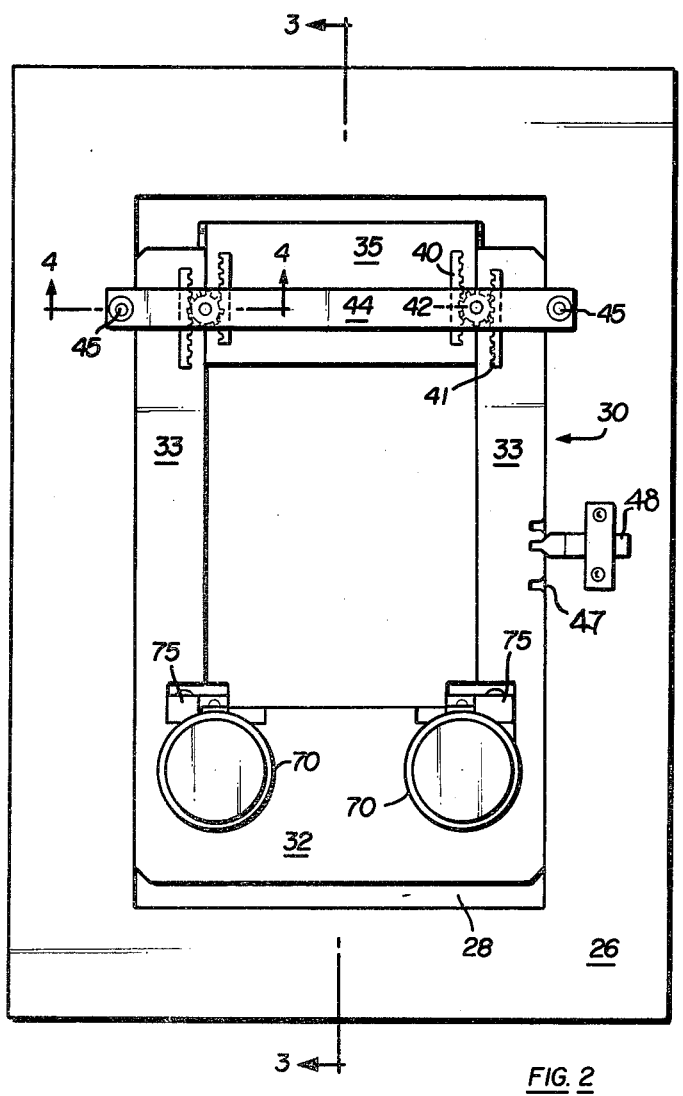
FIG. 2 is an elevational view of the mask and markers.
Figure 3:
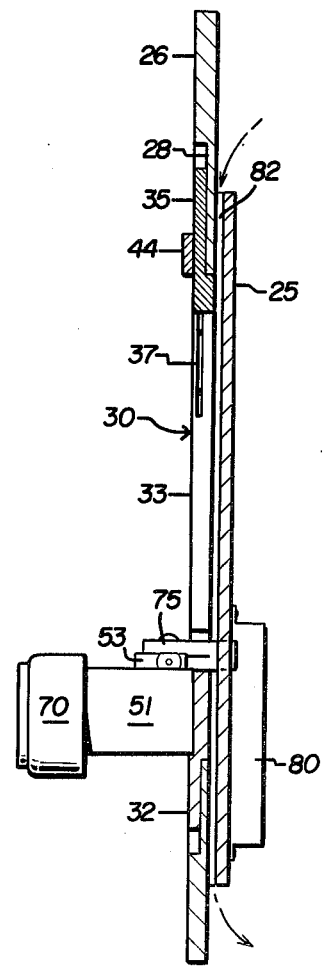
FIG. 3 is a cross-sectional view taken in the direction of arrows 3—3 of FIG. 2.

The photographic strip printer 10 is a commercially available apparatus produced in different models and sizes. Since it forms no part of the invention herein, it is described schematically. Basically, such type printers comprise a light tight box 11 having a negative compartment 12 and a positive sensitized paper strip compartment 13 separated by a separator wall 14 which has an opening to communicate the two compartments.

A roll of developed negatives 15 is mounted upon a suitable spindle and turning mechanism (not shown) which roll may consist of hundreds of feet of photographic negatives. The roll may be made up by splicing together, end to end, the shorter length roll of negatives from a number of customers, such as customers who bring snapshots to a drug store or similar photographic receiving business for processing the pictures. Thus, when the negatives are sent to the commercial printer, they may be spliced end to end, that is, the same size negatives, to form the negative roll 15 which then is processed through the appropriate chemicals to produce the finished negatives.

The roll 15 is opposed by a take-up roll 16 so that the negative strip 17 may pass between the two rolls and between a lens system 18, which is shown schematically and a light source 19, also schematically shown. An automatic apparatus, not shown, advances the negative roll or negative strip step by step so that one negative picture at a time is appropriately positioned for projection towards the positive paper.

In such types of commercial printer apparatus, the positive paper strip 20 which is formed of photographic sensitized paper is made up in the appropriate width of conventional pictures produced in commercial printing establishments, which pictures are generally larger than the negative pictures so that the lens system produces an enlarged image from the negative. The positive paper strip is formed in a roll 21 fed around appropriate guide rollers 22 and 23 to a take-up roll 24. By means of a suitable actuating mechanism, the paper 20 is advanced, one print length at a time from the supply roll 21 to the take-up roll 24. When the supply roll 21 is exhausted, the take-up roll 24 can be removed from the printer and then processed in developing equipment through the appropriate chemicals for producing the developed photograph from the latent images.

Thus, the essential operation of the printer is that the negative strip is advanced, one picture at a time, and momentarily held between the light source and the lens so that the operation of the light source projects the image upon the positive paper. Then both the positive and the negative are advanced for the next exposure.

The masking frame of this application is provided for the purposes of delineating the borders or edges of the projected latent image upon the positive paper 20.

A back plate 25 is arranged in the positive paper compartment to back up the strip of paper as it moves into the image exposure area. Spaced a short distance from the back plate is a base plate 26 having a central opening 27 whose defining edges are formed by a depressed margin area 28.

Fitted within the depressed margin 28 of the base plate 26 is a mask frame 30 formed of a suitable stiff sheet metal material. Such mask comprises a U-shaped unit 31 formed of a base strip 32 and side or leg strips 33 integral therewith. A movable strip 35 is provided to complete the rectangular form of the mask frame.

The opposite ends of the movable strip 35 are formed with tongues 36 which fit into grooves 37 formed in the inner edges of the legs or side strips 33 so that the movable strip may be slid towards or away from the base strip, but within the plane of the frame.

Figure 5:
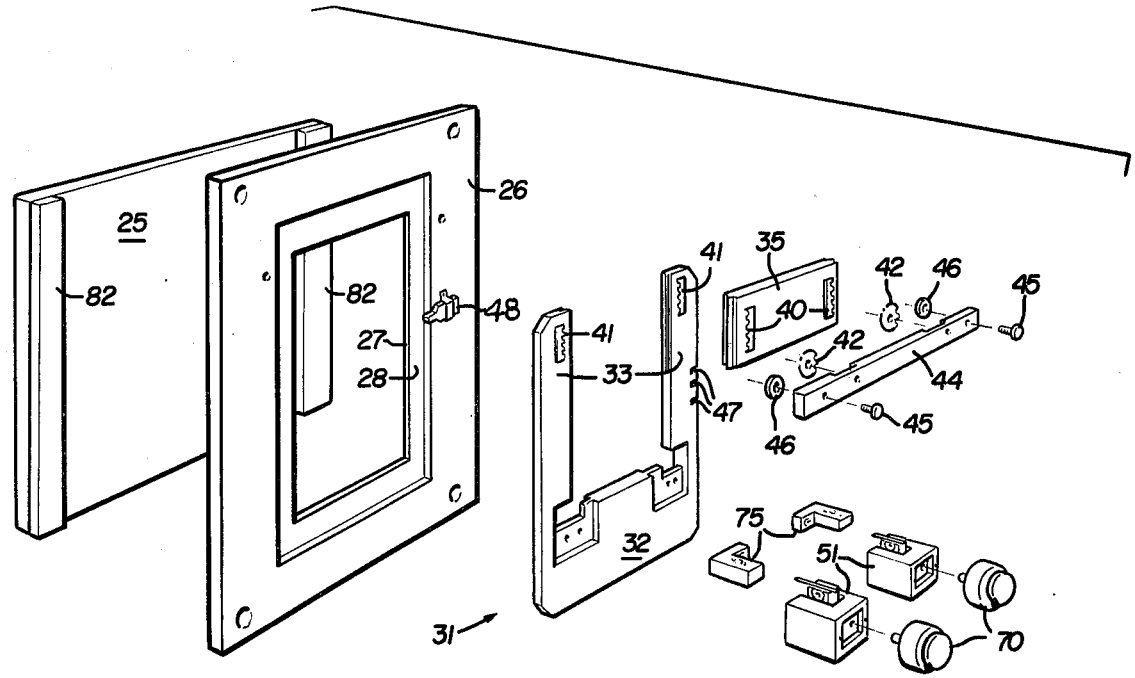
FIG. 5 is a perspective view of the parts comprising the mask.
Figure 4:
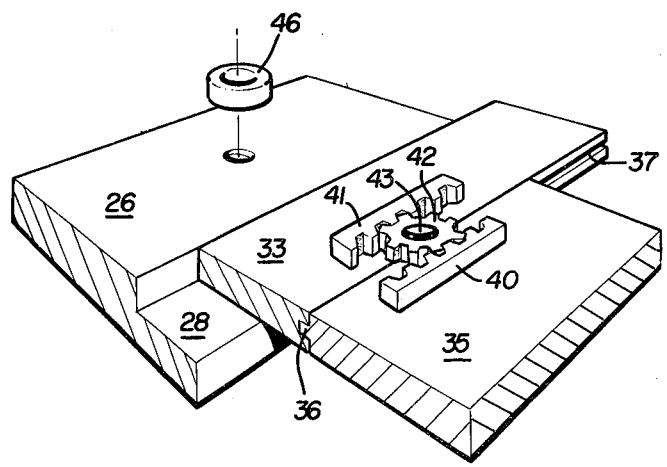
FIG. 4 is an enlarged, cross-sectional perspective view of a fragmentary portion of the mask.

As illustrated in FIG. 4, relative movement of the movable strip 35 and the base strip 32 is accomplished by providing toothed racks 40 and 41 upon the movable strip and the adjacent leg or side strip areas, with the racks being fastened in place and interconnected by a gear 32. The gear is provided with a stub shaft 43 for engagement within holes formed in a bar 44 which is like an elongated or enlarged strip of sheet metal. The bar is fastened by screws 45 through spacers 46 to the base plate 26 (see FIG. 5).

The side strips of the frame are provided with a number of notches 47 which are spaced apart appropriate distances for known or commercially available print sizes.

A conventional sliding type latch 48 is mounted upon the base plate for engaging one or another of the notches 47 to hold the frame in predetermined locations.

Mounted upon the base strip is a punch type marker 50. This device is formed with a bushing 51 having a bushing opening which preferably is square or rectangular, rather than circular. A slide or punch mover 52 which corresponds in shape to the opening in the bushing, is slidably fitted therein. The bushing is secured to the base strip by appropriate screws so that the slide may move towards and away from the base plate.

The slide or punch mover includes a transversely extending arm 53 which extends outwardly through a notch or slot formed in the bushing 54. A slot 55 is formed on the end of the arm to receive a thin, elongated, hardened blade 56. The top of the blade abuts against a shoulder 57 at the upper end of the arm slot and the bottom 58 of the blade is formed to physically punch through the paper. The bottom may be formed in a chisel like shape and the opposite end of the blade may likewise be formed so that the blade may be reversed when one end wears out. When the second end wears out, the blade itself can be replaced with a different blade.

The blade is fastened to the arm by means of a clamp. Thus, the arm is provided with a circular relief cut 59 which receives a pair of clamp jaws or cylinders 60 having facing edges which are dove-tailed cut at 61. The blade itself is formed with sloped side edges 62 midway of its length so as to correspond in shape to the dove-tailed groove formed by the opposing edges 61 of the cylinders 60. Thus, a screw 63 extending through the cylinders, when tightened, clamps the blade in place relative to the cylinders and relative to the arm.

The slide or punch mover is moved upwardly, i.e., away from the base strip, by means of a spring 64 located within a spring opening 65 formed in the slide.

To move the slide towards the paper, i.e., towards the base strip, a solenoid 67 is provided. This solenoid includes an armature 68, surrounded by a coil 69 located within a casing 70. The armature shaft 71 fits into a hole 72 formed in the slide. Thus, actuation of the solenoid, which may be done simultaneously with the actuation of the light source for projecting the image from the negative to the positive, will automatically actuate the slide and thus the punch to punch a thin, narrow slot in the paper at the very edge of the lead end of the print. Such slot then provides a marking means to be used in the manner described in the above mentioned U.S. Pat. Nos. 3,807,855 and 3,813,976.

Figure 6:
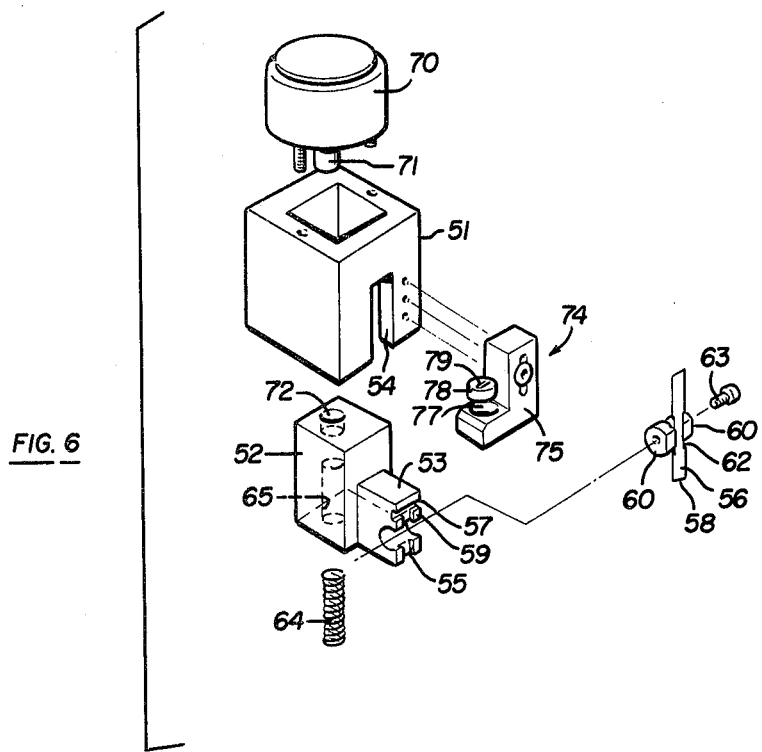
FIG. 6 is a perspective, disassembled view of the parts comprising the punch mechanism.
Figure 7:
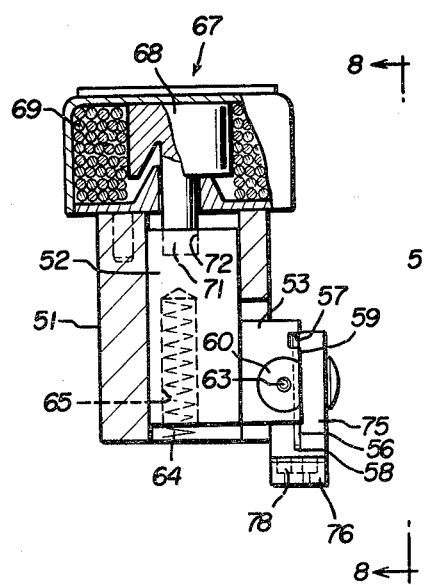
FIG. 7 is an enlarged, cross-sectional view of the punch mechanism.
Figure 8:
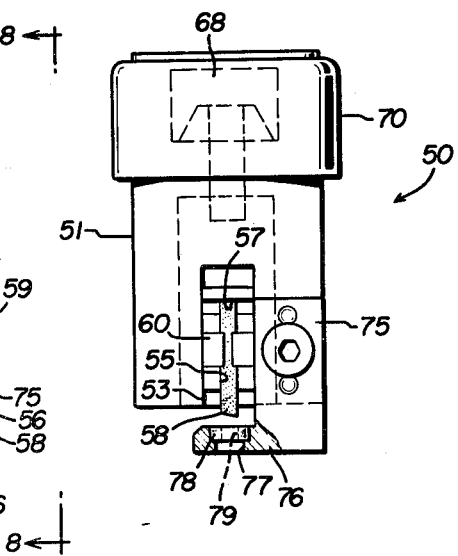
FIG. 8 is a view taken in the direction of arrows 8—8 of FIG. 7 of the punch.
Figure 9:
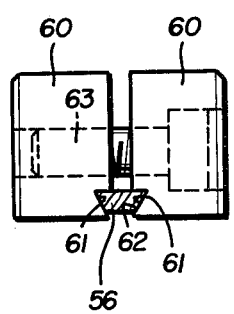
FIG. 9 is a cross-sectional view, to an enlarged scale, of the blade and the clamp grasping the blade.

In order to hold the positive paper and position it during the punching operation, an anvil 74 is provided. This anvil, which is L-shaped, is provided with a vertical leg 75 that is fastened by screws to the bushing (see FIG. 6). The base leg 76 of the anvil is located beneath the paper and is provided with an opening 77 that receives a hardened anvil button 78. The button is a removable piece that can be secured in the leg of the anvil and replaced when worn and is formed with a slot 79 of a size and shape to receive the punching end of the punch blade. The punched out paper from the slot may go through a hole in the backing plate 25 and to a suitable catching container 80 which may be emptied periodically.

The paper is provided with adequate space to pass between the backing plate and the base plate by utilizing spacer strips 82 to space the backing plate away from the base plate. Thus, the anvil leg actually fits within an opening formed in the backing plate so that it is beneath or on the side of the paper away from the punch blade.

The above described construction permits the use of a pre-formed mask-frame, base plate and backing plate and punch mechanism which can be inserted into an existing, conventional strip printer to replace the types of masks and markers presently used therein. The installation is simple and inexpensive to perform. The equipment requires suitable elelctrical circuitry to operate the solenoid during the time that the light is actuated. However, such circuitry is commercially available and forms no part of the invention herein.

In operation, the operator of the equipment, should he decide to adjust the mask to accommodate a different size photograph, can simply reach into the housing or box, move the releasing latch and re-position the adjustable mask to accommodate the pre-determined size required. This can be rapidly accomplished, as is evident.

In addition, while the description is directed towards one punch and solenoid system, there is actually a second, identical punch mechanism provided to form the punch marks for the end of each series of photographs. This forms a complete unit for installation in the existing equipment.

Having fully described an operative embodiment of this invention, I now claim:

1. An adjustable length mask for a photographic strip printer which projects a light through a strip of photographic negatives, one picture negative at a time, upon an elongated strip of photographic positive sensitized paper to thus form the latent image print thereon, said mask comprising:

a flat, four sided frame formed of two opposed side strips and two opposed end strips, namely, a base end strip and a movable end strip, for overlapping the positive paper and exposing a single print portion of the paper within the frame opening formed by the strips, the end strips being arranged transversely to the paper strip and the two side strips being joined to the base end strip to form a U-shaped unit, with the side strips being arranged at and parallel to the opposite edges of the paper strip and being of a length greater than the length of a single print;

said movable end strip extending between and having its opposite ends slidably engaging the side strips, wherein the strips have inner edges which define the side and opposite end edges of the latent image print;

manually operable means connected between said movable end strip and an adjacent side strip for slidably moving the movable end strip between the side strips, towards and away from the base strip for adjusting the length of the frame opening, and thus, the longitudinal length of the print, movement of either the end strip or the U-shaped unit correspondingly moves the other to thereby increase and decrease the length of the latent image print without changing the location of the geometric center of the mask;

a marker means mounted upon the base strip away from the frame opening, and having a marking elememt positioned at the inner edge of the base strip for forming a mark upon the paper at the end of the print adjacent the base strip inner edge at the time that the latent image is formed.

2. A construction as defined in claim 1 above, and including the opposite ends of the movable strip and the adjacent inner edges of the side strips having interengaging tongues and groove-like formations for slidably interconnecting the movable stip to said side strips and positioning said strips in the same plane.

3. A construction as defined in claim 1, and said means for moving the movable end strip including elongated, opposed, toothed racks mounted upon the movable end strip and an adjacent side strip, and a gear interposed between the racks and rotatably mounted upon a fixed support.

4. A construction as defined in claim 3, and including a large base plate having a central opening corresponding in shape to, but being larger than, the mask frame opening, and said mask being positioned and supported upon the base plate, with said base plate being adapted for mounting within the printer apparatus, with the positive paper strip moving across one face of the base plate and the mask mounted upon the opposite face of the base plate, i.e., between the negative strip and the base plate.

5. A construction as defined in claim 4, and including a depressed margin formed around the opening of the base plate and of a length and width to receive the mask and permit relative movement of the mask U-shaped unit and movable strip for elongating the latent image print to a predetermined maximum length.

6. A construction as defined in claim 1, and said marker comprising a thin, narrow blade arranged to move endwise into and out of the paper strip at the edge of the print defined by the inner edge of the base strip;

a bushing mounted upon the base strip and a movable blade holder member slidably mounted within the bushing for movement in a direction parallel to the blade length, and a clamp arm extending from said member towards the mask opening and having a clamp receiving and holding the blade thereon;

an electrical solenoid engaged with said blade holder member for operating the marker by moving the member and attached blade towards the paper for thereby punching a narrow hole to form the mark at the edge of the print.

7. A strip marker punch comprising:

a thin, narrow, elongated punch blade arranged for axial endwise movement for punching a narrow slot in a paper strip;

a blade holder including an arm extending transversely of the blade and having a clamp on one end for rigidly and releasably securing the blade to the arm, and with the opposite end of the arm connected to a punch mover member arranged parallel to the axis of the blade;

said punch mover member being slidably fitted within a bushing for supporting and guiding said member for movement in a direction parallel to and along side the blade;

and means for moving said punch mover member for thereby moving the blade along a path which is remote from the punch mover member, and said means for moving said punch mover member comprising an electrical solenoid mounted upon the bushing and having its movable armature engaged with the punch mover member for moving said member and the attached punch blade toward said strip, and means for automatically returning said member to a normal, initial position wherein the punch is normally spaced from the strip.

8. A strip marker punch as defined in claim 7 above, and including an elongated slot formed in said bushing, with said arm extending through the slot, transversely of the bushing so that the arm may move within the bushing slot in accordance with movement of the punch mover member, and with the clamp end of the arm being located a substantial distance laterally away from the bushing, to thereby locate the punch blade remotely from the remainder of the punch mechanism.

9. A strip marker punch as defined in claim 7 above, and said clamp comprising a pair of opposed clamp jaws arranged transversely of the blade and having opposed jaw faces which are shaped so that together they define a dovetailed slot within which said blade is positioned, with the opposed long edges of the blade, at locations between the opposite ends of the blade, being shaped to correspond to the slot shape for snugly fitting therein, and said members being mounted upon the arm end having a bolt-like fastener member for moving and holding the jaw members together to thereby squeeze the blade therebetween.

* * * * *